(12) United States Patent
Laffey et al.

(10) Patent No.: US 8,477,045 B2
(45) Date of Patent: Jul. 2, 2013

(54) CONFIGURATION INFORMATION PROVIDED TO CONFIGURABLE ELECTRONIC DEVICE RESIDING IN A SHIPPING BOX

(75) Inventors: Thomas M. Laffey, Roseville, CA (US); Dick T. Fong, Sacramento, CA (US); Dennis Carr, Roseville, CA (US); Kevin Boyum, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 532 days.

(21) Appl. No.: 12/608,720

(22) Filed: Oct. 29, 2009

(65) Prior Publication Data

US 2011/0102148 A1    May 5, 2011

(51) Int. Cl.
*H04Q 5/22* (2006.01)
*G08B 13/14* (2006.01)
*G08B 5/00* (2006.01)
*G06F 9/00* (2006.01)

(52) U.S. Cl.
USPC .............. 340/815.63; 340/10.1; 340/572.1; 340/10.34; 340/7.36; 713/2

(58) Field of Classification Search
None
See application file for complete search history.

(56) References Cited

U.S. PATENT DOCUMENTS

| | | | | |
|---|---|---|---|---|
| 5,825,643 | A | * | 10/1998 | Dvorak et al. .................. 700/12 |
| 5,927,050 | A | | 7/1999 | Houck et al. |
| 6,256,732 | B1 | | 7/2001 | Cromer et al. |
| 6,876,295 | B1 | * | 4/2005 | Lewis ........................ 340/10.34 |
| 7,035,595 | B1 | * | 4/2006 | Kim et al. ........................ 455/73 |
| 7,673,078 | B2 | * | 3/2010 | Cagno et al. .................... 710/10 |
| 7,880,590 | B2 | * | 2/2011 | Jam et al. .................. 340/10.51 |
| 7,902,964 | B2 | * | 3/2011 | Rommelmann et al. ... 340/10.51 |
| 2002/0055345 | A1 | * | 5/2002 | Wood, Jr. ................... 455/277.1 |
| 2007/0146138 | A1 | * | 6/2007 | Phipps et al. .............. 340/572.7 |
| 2008/0018431 | A1 | * | 1/2008 | Turner et al. ................. 340/10.2 |
| 2009/0033463 | A1 | * | 2/2009 | Posamentier ................ 340/10.1 |

* cited by examiner

*Primary Examiner* — Jennifer Mehmood
*Assistant Examiner* — Fekadeselassie Girma

(57) ABSTRACT

An apparatus comprises a shipping box containing an access area and a configurable electronic device. The configurable electronic device comprises an electrical connector accessible via the access area on the shipping box. The configurable electronic device also comprises a management module that receives electrical power via the electrical connector when a single external cable is mated to the electrical connector through the access area. The management module receives configuration information via the single external cable while the configurable electronic device is still in the shipping box and without having host logic in the configurable electronic device being powered up. In other embodiments, multiple configurable electronic devices can be reconfigured simultaneously and wirelessly by an external programming unit.

13 Claims, 6 Drawing Sheets

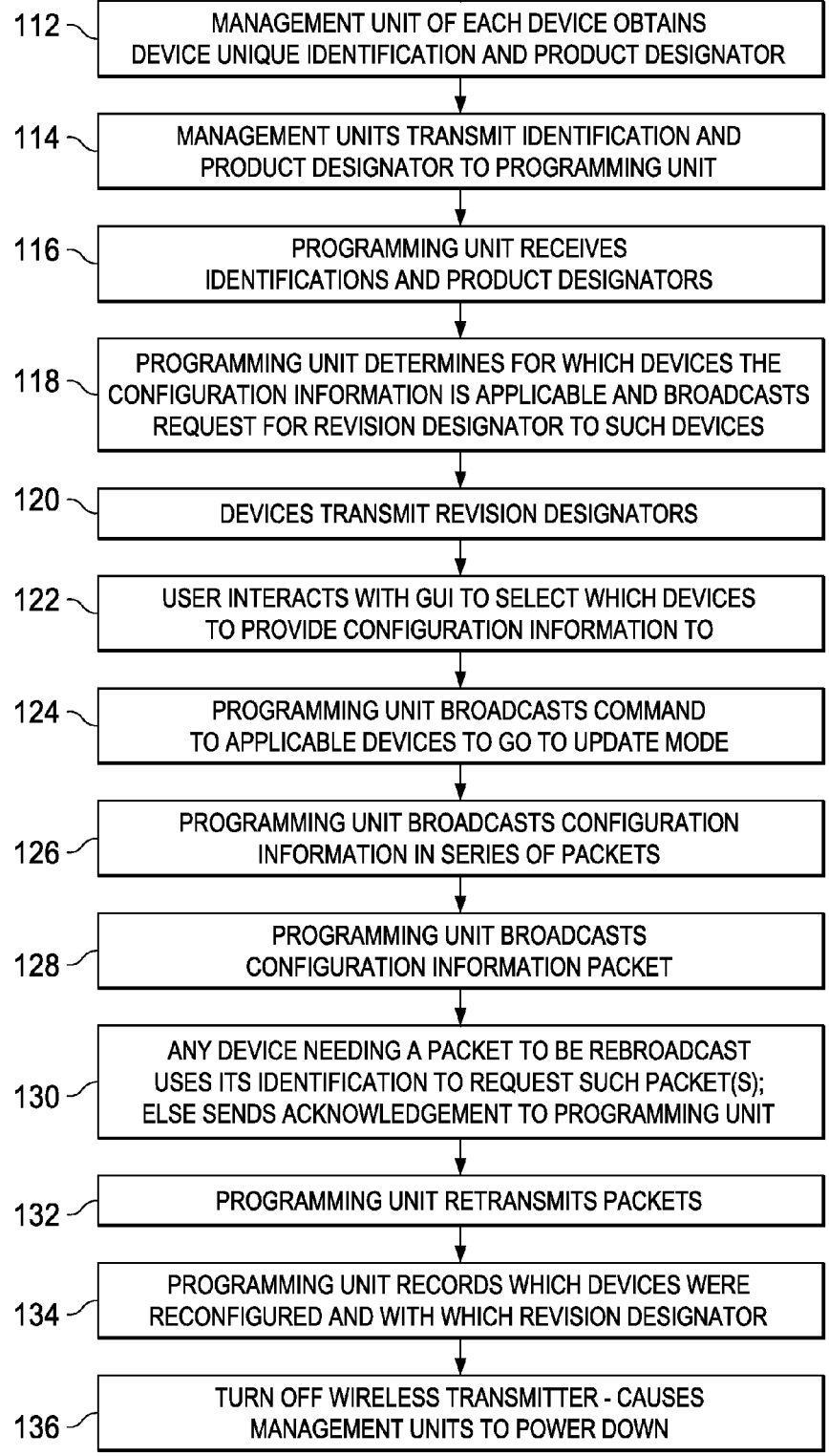

CONFIGURATION INFORMATION PROVIDED TO CONFIGURABLE ELECTRONIC DEVICE RESIDING IN A SHIPPING BOX

BACKGROUND

Many types of electronic devices (e.g., servers, switches, etc.) may have configuration information (e.g., firmware) that can be altered, updated, and/or replaced. Once such a device is manufactured and put into a shipping box for shipment, for example to a customer or retailer, the device unfortunately normally cannot be reconfigured until it has been taken out of the shipping box and set up. If a firmware patch is created after the devices that would use the patch have been placed into their shipping box, such devices will have to wait until they are set up and fully operational before the patches can be installed.

BRIEF DESCRIPTION OF THE DRAWINGS

For a detailed description of exemplary embodiments of the invention, reference will now be made to the accompanying drawings in which:

FIGS. 2A and 2B show a method corresponding to the system of FIG. 1 in accordance with various embodiments;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
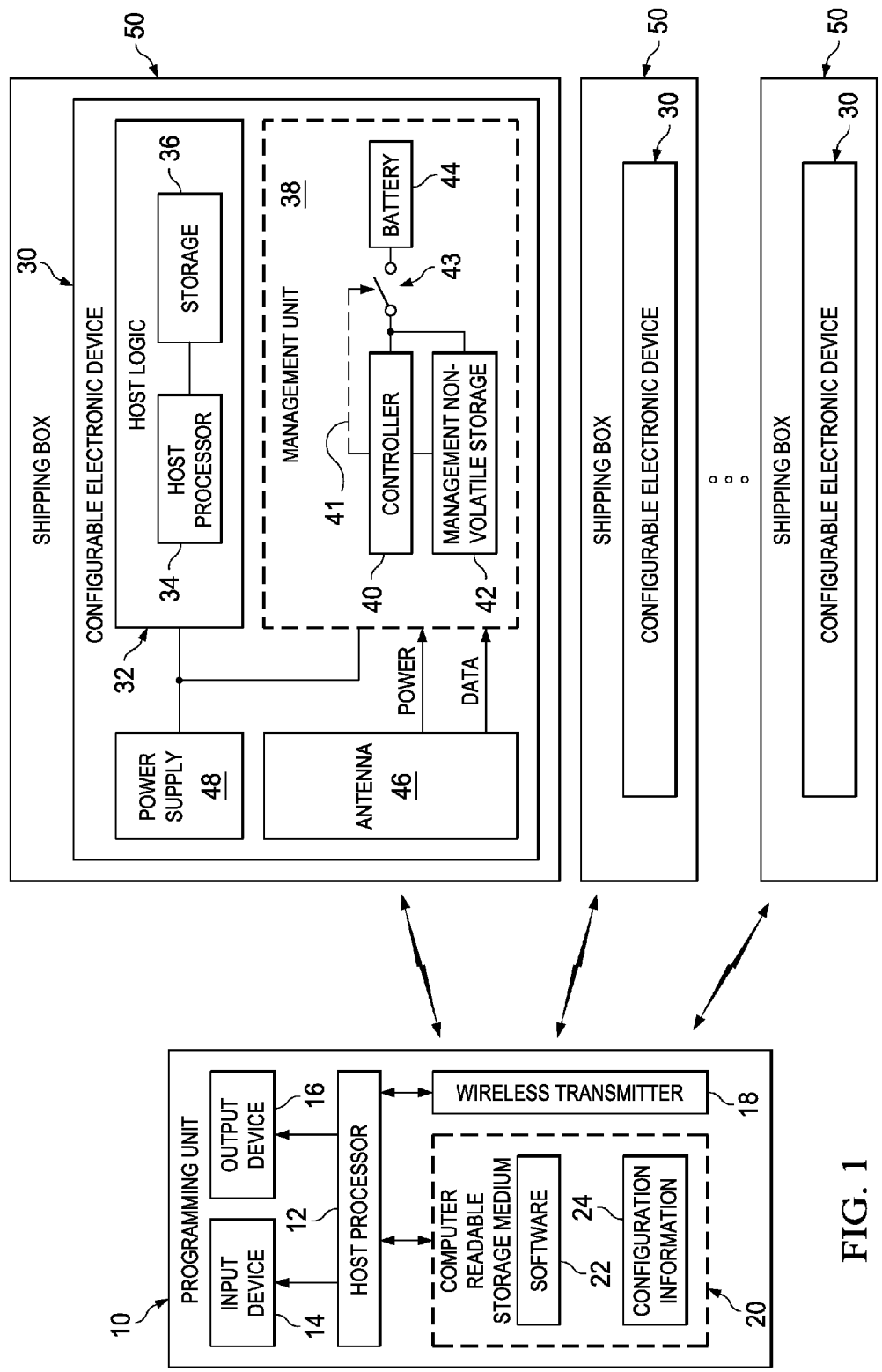
FIG. 1 shows a system in accordance with various embodiments of the invention.

FIG. 1 shows a programming unit 10 that wirelessly communicates with one or more configurable electronic devices 30 and does so while each such configurable electronic device 30 is contained in a shipping box 50 (e.g., a cardboard box). Further, the programming unit 10 is configured to wirelessly and simultaneously configure multiple of such configurable electronic devices 30. For example, the programming unit 10 can wirelessly broadcast configuration information that is simultaneously received and processed by one or more of the configurable electronic devices 30.

The programming unit 10 of FIG. 1 comprises a host processor 12 coupled to an input device 14, an output device 16, a wireless transmitter 18, and a computer-readable storage medium (CRSM) 20. The input device 14 may comprise a keyboard, mouse, and the like. The output device 16 comprises a display. The computer-readable storage medium 20 may comprise volatile memory (e.g., random access memory), non-volatile storage (e.g., hard disk drive, Flash storage, compact disc read-only memory (CD ROM), etc.), or combinations thereof. The computer-readable storage medium 20 includes software 22 that is executable by the host processor 12, as well as configuration information 24 to be provided to the various configurable electronic devices 30. The wireless transmitter 18 can employ any number of wireless standards or protocols such as wireless USB or Zigbee. The architecture of the programming unit 10 can be different than that shown in FIG. 1.

In accordance with at least some embodiments, the configuration information 24 comprises firmware to be provided to and executed on the various configurable electronic devices 30. The configuration information 24 alternatively or additionally may comprise operational settings or other parameters.

Each configurable electronic device 30 comprises host logic 32 coupled to a management unit 38. The host logic 32 comprises the configurable electronic device's host processor 34, storage 36 (e.g., memory, electrically erasable read only memory (EEPROM), CMOS storage, etc.), and various other components as desired. The management unit 38 comprises a controller 40 coupled to management non-volatile storage (NVS) 42 and a battery 44. An antenna 46 coupled to the management unit 38 is also provided. The antenna 46 is used to wirelessly communicate with the programming unit 10. The electronic device 30 also comprises a power supply 48 that, once connected to an AC power source, converts AC power to DC power for powering the host logic 32 and the management unit 38.

In accordance with at least some embodiments, the management unit 38 is used only to wirelessly communicate with the programming unit 10 to receive new configuration information 24 (e.g., firmware updates). In other embodiments, the management unit 38 may have other functionality as well.

Each configurable electronic device 30 may comprise a computer (e.g., a server), a switch, a router, or in general, any type of device for which configuration information (e.g., firmware) can be updated. FIG. 1 illustrates multiple configurable electronic devices 30 to be reconfigured. All of such configurable electronic devices 30 may be the same (e.g., have the same product designation). Some of the configurable electronic devices 30, however, may be different, that is, have different product designations than other configurable electronic devices 30 (e.g., different models of servers, or different product types altogether). Further, the programming unit 10 may have configuration information 24 that pertains only to a subset of the configurable electronic devices 30. For example, the configuration information 24 in the programming unit 10 may only be applicable to certain models of servers or switches, or certain models of servers or switches that have certain revisions of firmware.

In some embodiments, the configurable electronic device 30 wirelessly receives the configuration information from the programming unit 10 and stores the received configuration information in the management NVS 42. The transmission of the configuration information 24 from the programming unit 10 to the electronic device 30 may occur while the electronic device is still in it shipping box 50. Later, once the electronic device 30 has been removed from its shipping box 50, set up, and turned on, the host logic 32 determines that the management NVS 42 contains new configuration information and retrieves the configuration information from the management NVS 42 to write to storage 36 for use by the host logic. In yet other embodiments, the management unit 38 receives the configuration information from the programming unit 10 and stores such information directly in storage 36 of the host logic 32 in addition to or instead of its management NVS 42.

In accordance with some embodiments, the management unit's controller 40 comprises a low-power microcontroller that can be powered by the electrical signals induced in the antenna 46 from the wireless signals received by the antenna 46 from the programming unit's wireless transmitter 18. In some such embodiments, the electrical signals from the antenna 46 power on the controller 40 which then determines whether the antenna 46, and thus the controller, has received a particular (predetermined) bit sequence from the programming unit 10. This bit sequence is indicative of the start of a wireless reconfiguration process initiated by the programming unit 10. If the predetermined bit sequence is detected by the controller 40, the controller activates the battery 44 to supply the controller 40 and management NVS 42 with power instead of the antenna 46. Thus, in such embodiments the radiation impinged on the antenna 46 causes the microcontroller 40 to be activated so as to determine whether the battery 44 should be activated. If the battery 44 is activated, then from that point on while the configuration process is occurring the management unit 38 is powered by its battery. In some embodiments, activating the battery 44 comprises a control signal 41 from the controller 40 closing a solid state switch 43 (e.g., a field effect transistor) to permit current from the battery 44 to flow to the controller 40.

Figure 2A:
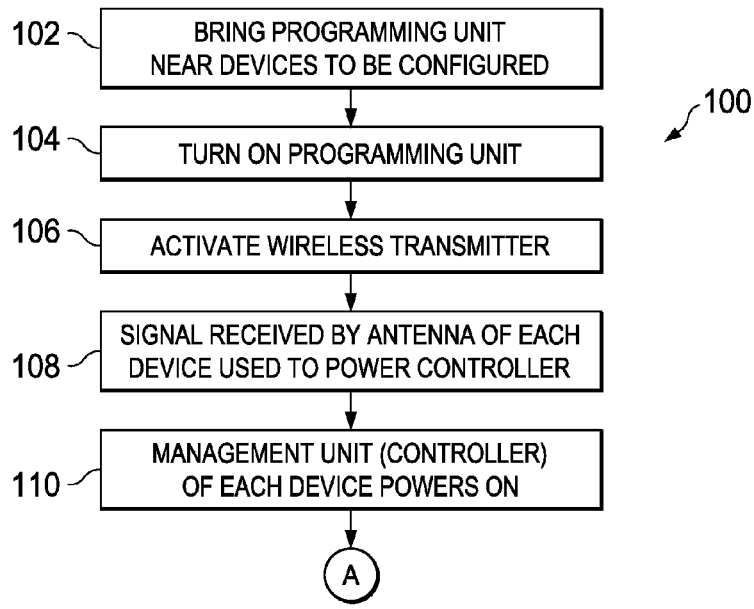
Figure 3:
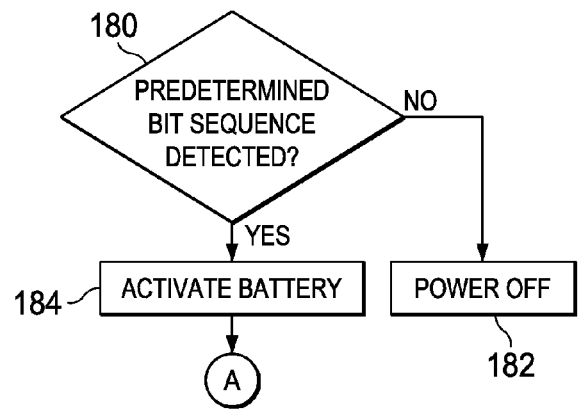
FIG. 3 shows an example method of implementing a portion of the method depicted in FIGS. 2A and 2B in accordance with various embodiments.

FIGS. 2A, 2B, and 3 provide a method in accordance with various embodiments for wirelessly and simultaneously providing the configuration information from the programming unit 10 to various configurable electronic devices 30. FIGS. 2A, 2B, and 3 will now be discussed with reference to FIG. 1 as well. The various actions listed in FIGS. 2A, 2B, and 3 can be performed in the order shown or in a different order. Some of the actions may be performed in parallel. Some of the actions are performed by the programming unit 10 and other actions are performed by the configurable electronic devices 30. The actions performed by the programming unit 10 may be performed by the programming unit's host processor 12 upon execution of software 22. The actions performed by the configurable electronic devices 30 may be performed by the controller 40 which may contain its own embedded firmware. The reconfiguration process depicted in FIGS. 2A, 2B, and 3 describe how the various configurable electronic devices 30 can be simultaneously reconfigured and reconfigured without powering on the devices' host logic 32.

Referring to FIG. 2A, at 102, the programming unit 10, which may be portable, is brought near the configurable electronic devices 30 to be configured (i.e., near enough to be within communication range of the configurable electronic devices 30). In some cases, the electronic devices 30 may be in their shipping boxes 50 and stacked ready for shipment to a customer. The configurable electronic devices 30 may all be of the same product designation for which the programming unit's configuration information 24 is applicable. Alternatively, some of the configurable electronic devices 30 may be different (different product designators) than other of the devices 30 and the configuration information 24 may be applicable only to a subset of the configurable electronic devices 30 that are within wireless communication range of the programming unit 10. Further still, even for configurable electronic devices 30 that have the same product designator, some such devices 30 may have a different revision of the configuration information to be updated by the programming unit 10. For example, a firmware patch may be created that is to be installed in a particular model of the configurable electronic devices 30, or a particular model configurable electronic device 30 that has a particular firmware revision. For instance, the firmware patch from the programming unit 10 may be designated revision number 1.4 and may apply only to model XYZ configurable electronic devices 30 whose firmware is revision number 1.3 or lower (1.0, 1.1, 1.2, or 1.3).

At 104, a user turns on the programming unit 10, and at 106 the host processor 12 in the programming unit 10 turns on the wireless transmitter 18 which begins to transmit a wireless signal encoded with the predetermined bit stream described above. In some embodiments, the predetermined bit stream is repeated two or more times to give the configurable electronic devices 30 a chance to detect the bit stream and react as described below. At 108, the antenna 46 of each configurable electronic device 30 within communication range of the programming unit 10 receives the wireless signal from the programming unit 10. That wireless signal is converted to an electrical signal by each antenna 46 which, at 110, then powers each controller 40 of the corresponding management unit 38. In some embodiments, upon being powered on, the controller 40 may transmit an "hello" message to initiate a communication session with the programming unit 10.

FIG. 3 provides additional detail as to how the controller 40 is powered up in action 110. As shown, the controller 40 examines the signal being received from the antenna 46 for the predetermined bit stream (180). If the predetermined bit stream is not detected in the signal from the antenna 46, then the controller 40 shuts off at 182. On the other hand, if the controller 40 detects the presence of the predetermined bit stream, then at 184, the controller 40 activates battery 44 (e.g., closed switch 43) to supply power to the controller 40 instead of the antenna 46. The predetermined bit stream functions as a mechanism to prevent the controller 40 of a configurable electronic device 30 from continuing to operate when the configurable electronic device 30 is near a wireless source whose signal is picked up by the antenna 46.

Referring to FIG. 2B, upon being powered up, the management unit 38 (and specifically the controller 40) of each configurable electronic device 30 obtains at 112 a device unique identifier (ID) and product designator from its management NVS 42 or from an electrically-erasable programmable read-only memory (EEPROM) which may be part of storage 36. In some embodiments, the device unique ID is the configurable electronic device's serial number. The product designator in some embodiments is the configurable electronic device's model number. At 114, the management unit 38 of each configurable electronic device 30 transmits its particular device unique ID and product designator to the programming unit 10 which receives such values at 116.

At 118, the programming unit 10 determines which configurable electronic devices 30 the configuration information 24 applies to and broadcasts a request for the current revision number associated with the configuration information of the targeted configurable electronic devices 30. The configuration information 24 stored in the programming unit's CRSM 20 contains additional information that identifies the particular configurable electronic device(s) to which the configuration information 24 pertains. The request for the revision numbers may be a message that contains the device unique IDs of only those configurable electronic devices 30 that are candidates for the programming unit's new configuration information 24. Accordingly, while all of the configurable electronic devices 30 within communication range receive the broadcast request, only those devices whose device unique IDs match those IDs contained in the request will respond to the request. Such responses contain the requested current revision information and are transmitted by the relevant devices 30 (at 120).

The programming unit 10 receives the responses from the various configurable electronic devices 30 as to their revision information and, in some embodiments, displays in a graphical user interface (GUI) (implemented by software 22) on output device 16 a list of all configurable electronic devices 30 the programming unit 10 has detected within its wireless communication. The GUI thus may contain configurable electronic devices 30 that are close to the programming unit 10 (i.e., within wireless communication range), but are of a product designator for which the programming unit's configuration information 24 is not applicable. The GUI may also list those configurable electronic devices 30 that are also close to (within wireless communication range), but that are of a product designator for which the programming unit's configuration information 24 is applicable. Further, the GUI may specify which configurable electronic devices 30 have configuration information whose current revision number is such that the programming unit's configuration information is applicable. The GUI may provide the device unique ID for each device listed and permit a user of the programming unit to specify which configurable electronic devices 30 the user wishes to reconfigure (122).

At 124, the programming unit 10 broadcasts a command for certain configurable electronic devices 30 to transition to an update mode. The broadcast command includes the device unique IDs of those configurable electronic devices 30 that are to receive and store the configuration information. A configurable electronic device 30 that receives this command and that determines the command to contain its that device's own device unique ID transitions to its update mode in which it is then ready to receive the configuration information 24 from the programming unit 10. In such embodiments, a configurable electronic device 30 must be in its update mode in order to store the configuration information. A configurable electronic device 30 that is not in the update mode ignores all further messages from the programming unit 10 that contain the configuration information, and thus does not store any configuration information subsequently transmitted by the programming unit 10.

At 126, the programming unit 10 broadcasts a series of packets containing portions of the configuration information 24. In accordance with some embodiments, each packet contains one or more error bits, a packet sequence number, and a data payload. The data payload contains at least some of the configuration information. The error bits provide a mechanism for the configurable electronic devices 30 to detect transmission errors in the packets. In some embodiments, the error bits comprise one or more cyclic redundancy check (CRC) bits, parity bits, error correction code (ECC) bits, etc. The packet sequence number is a sequential number that is different for each packet and is usable by the configurable electronic devices 30 to assemble the configuration information in the correct order. In some embodiments, the sequence number is an integer that is incremented with each succeeding packet being sent. The packets may or may not contain the device unique IDs of those configurable electronic devices 30 that are to receive and store the configuration information. In some embodiments, the entire configuration information 24 could be transmitted in its entirety in one wireless packet by the programming unit 10, rather than in a series of packets.

Upon a configurable electronic device 30 receiving a particular packet, the management unit 38 of that configurable electronic device uses the error bits to determine whether that packet was received correctly or in error. If the packet was received incorrectly, the management unit 38 records in a register internal to the controller 40 or in the management NVS 42 an identify of the incorrectly received packet using that packet's sequence number. In accordance with various embodiments, the management unit 38 does not immediately request the programming unit 10 to resend a packet received incorrectly. Rather, the management unit 38 waits until all packets have been sent before requesting a transmission of any packet received incorrectly.

After all of configuration information 24 has been broadcast to the relevant configurable electronic devices 30 (or commensurate with the last packet containing configuration information), the programming unit 10 transmits a packet (at 128) that indicates that all of the configuration information has been sent. While the various constituent packets were being sent, each configurable electronic device 30, as explained above, used the error bits to determine whether any packets were received in error. Each configurable electronic device 30 recorded the identity of any packet(s) (using the packet sequence numbers) that were received in error and that thus need to be retransmitted by the programming unit 10. Once each configurable electronic device 30 is informed by the programming unit 10 that all packets have been sent containing the configuration information, each configurable electronic device 30, that has received any packets with errors, transmits (130) a request to the programming unit 10 to retransmit all such packets. At 132, the programming unit 10 retransmits all packets requested by the configurable electronics devices 30 to be retransmitted.

At 134, the programming unit 10 logs which configurable electronic devices 30 were successfully reconfigured. At 136, the host controller 12 turns off power to the transmitter 18. Each controller 40 detects the absence of a signal from the programming unit for a timeout period of time (e.g., 30 seconds) and then releases the control signal 41 to the switch 43 to cause power from battery 44 to the controller to be discontinued.

In accordance with the preceding embodiments, the programming unit wirelessly communicated with the various configurable electronic devices 30 to reconfigure such devices even while the devices were still contained in their shipping boxes. In accordance with another embodiment, the programming unit 10 connects to the configurable electronic device 30 while still in its shipping box via a single cable that carries both power and data from the programming unit 10 to the configurable electronic device 30. A perforated flap on the shipping box can be opened to thereby expose a connector on the configurable electronic device 30. The flap 252 thus defines an access area through which the configurable electronic device's connector is exposed.

Figure 4:
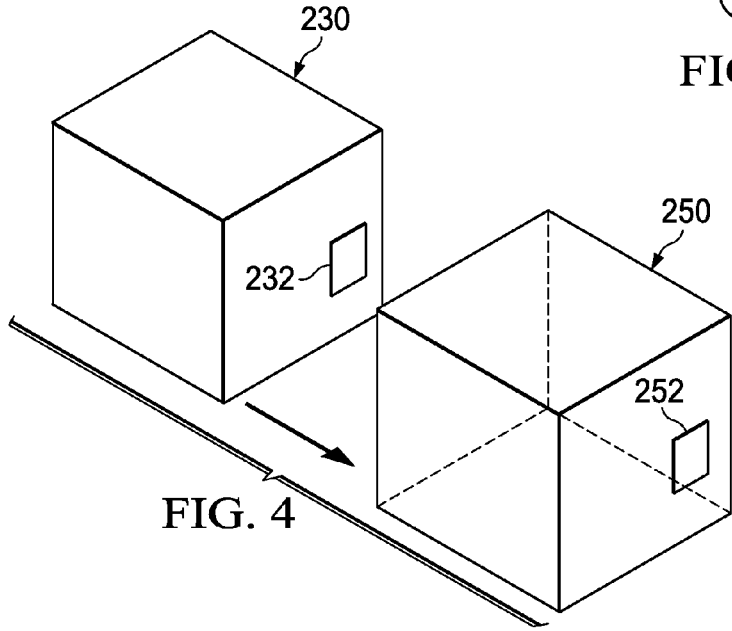
FIG. 4 shows a shipping box with a flap to expose a connector on configurable electronic device in accordance with various embodiments.

FIG. 4 illustrates a shipping box 250 into which a configurable electronic device 230 can be inserted for shipping. The box 250 comprises a rectangular flap 252 (or other suitable shape) which may be perforated along three of its edges. The flap 252 can be opened along the perforated edges and hinged about the fourth, non-perforated edge. Once opened, a connector 233 provided on exterior surface of a chassis of the configurable electronic device 230 is exposed.

Figure 5:
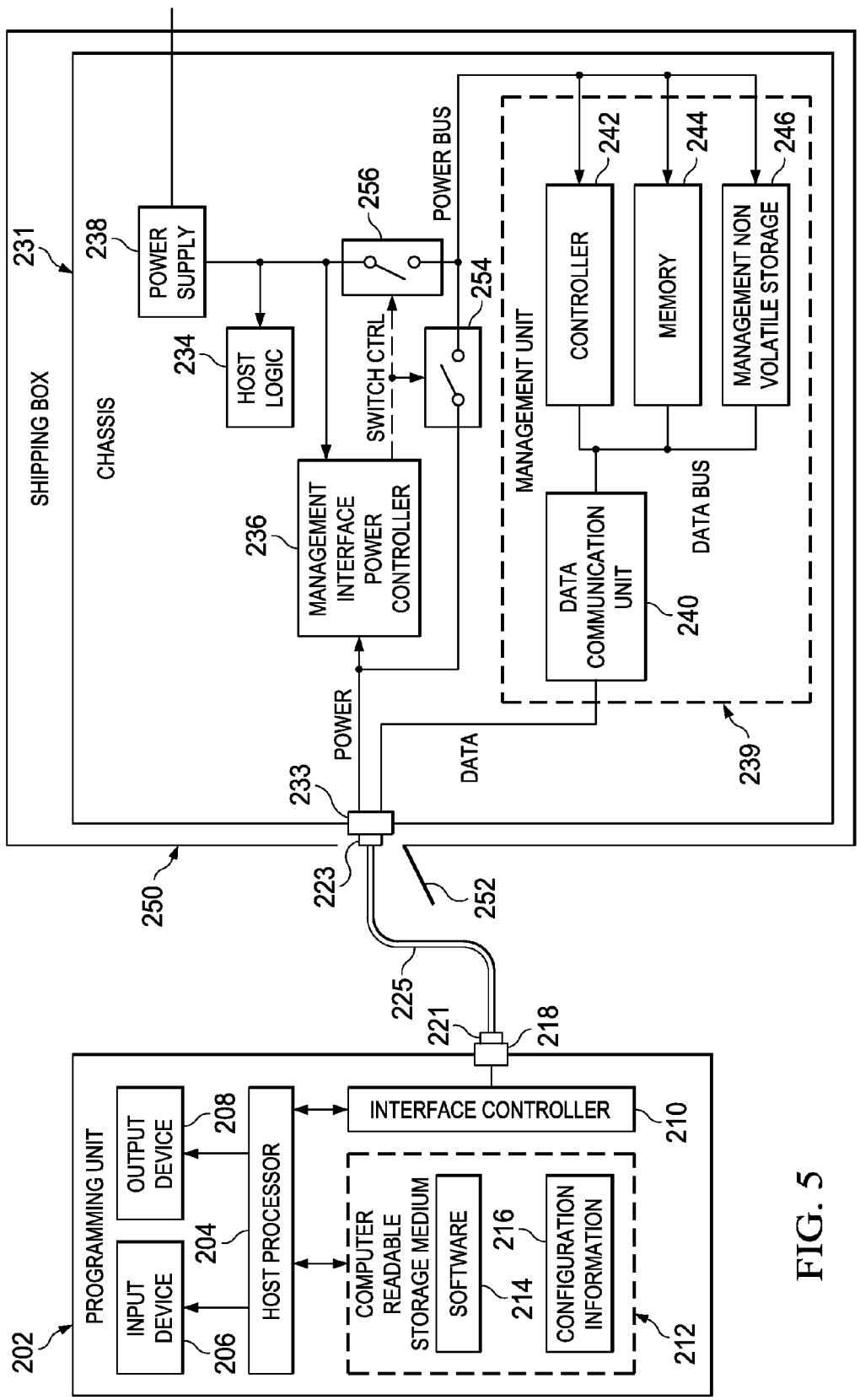
FIG. 5 shows a system in which a configurable electronic device can be reconfigured through the flap on the shipping box of FIG. 4 in accordance with other embodiments of the invention.

FIG. 5 illustrates a programming unit 202 connected by way of a cable 225 to the configurable electronic device 230 contained within the shipping box 250. Opposing ends of cable 225 include connectors 221 and 223. Cable connector 221 connects to a corresponding connector 218 on the programming unit 202 while cable connector 223 connects to connector 233 on the configurable electronic device 230.

The programming unit 202 is similar in some regards to programming unit 10 shown in FIG. 1. The programming unit 202 of FIG. 5 comprises a host processor 204 coupled to an input device 206, an output device 208, an interface controller 210, and a computer-readable storage medium (CRSM) 212. The input device 206 may comprise a keyboard, mouse, and the like. The output device 208 comprises a display. The computer-readable storage medium 212 may comprise volatile memory (e.g., random access memory), non-volatile storage (e.g., hard disk drive, Flash storage, compact disc read only memory (CDROM), etc.), or combinations thereof. The computer-readable storage medium 212 includes software 214 that is executable by the host processor 12, as well as configuration information 216 to be provided to the configurable electronic device 230. In accordance with at least some embodiments, the configuration information 24 comprises firmware or other types of information to be provided to and executed on the configurable electronic devices 230.

The configurable electronic device 230 comprises a chassis 231 on which the connector 233 is provided and which contains the various components shown. Such components include, for example, host logic 234, a management interface power controller 236, a power supply 238, a data communication unit 240, a controller 242, memory 244, and a management NVS 246. The data communication unit 240, controller 242, memory 244, and management NVS 246 are coupled together to form a management unit 239. If the configurable electronic device 230 were connected to an AC power source, the power supply 238 would supply appropriate DC power to the host logic 234 (which may comprise a processor, memory, etc.) and the management interface power controller 236. The data communication unit 240 controls communications between the management unit 239 and the programming unit 202.

While the configurable electronic device 230 is still in the shipping box 250, the power supply 238 is not connected to an AC power source. Instead, DC power is supplied by the programming unit 202 via cable 225. Power provided by cable 225 is provided to the data communication unit 240, controller 242, memory 244, and management NVS 246. In various embodiments, such cable-supplied power is not provided to the host logic 234, management interface power controller 236, and power supply 238. Power switches 254 and 256 (e.g., field effect transistors) control the flow of power supplied by the programming unit 202. The management interface power controller 236 controls the state of the switches 254 and 256. Switch 254 is closed to permit current from the programming unit 202 to power the controller 242, memory 244, and management NVS 246. Switch 256 prevents current from the programming unit 202 from reaching the host logic 234, management interface power controller 236, and power supply 238.

Once the programming unit 202 is connected via cable 225 to the configurable electronic device 230, power from the interface controller 210 of the programming unit 202 is provided through the connector 233 on the configurable electronic device 230 for powering the data communication unit 240, controller 242, memory 244, and management NVS 246. With such components powered on, the programming unit 202 can provide the configuration information 216 to the management NVS 246, or directly to storage in the host logic 234.

Figure 6A:
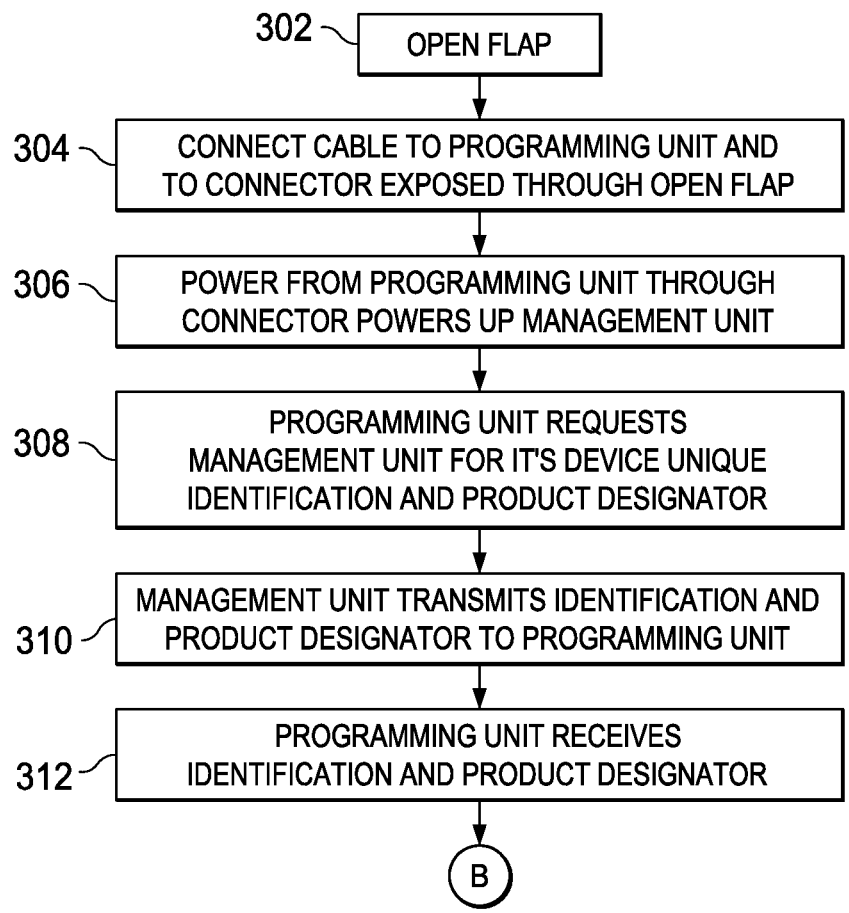
FIGS. 6A and 6B show a method corresponding to the system of FIG. 5 in accordance with various embodiments.
Figure 6B:
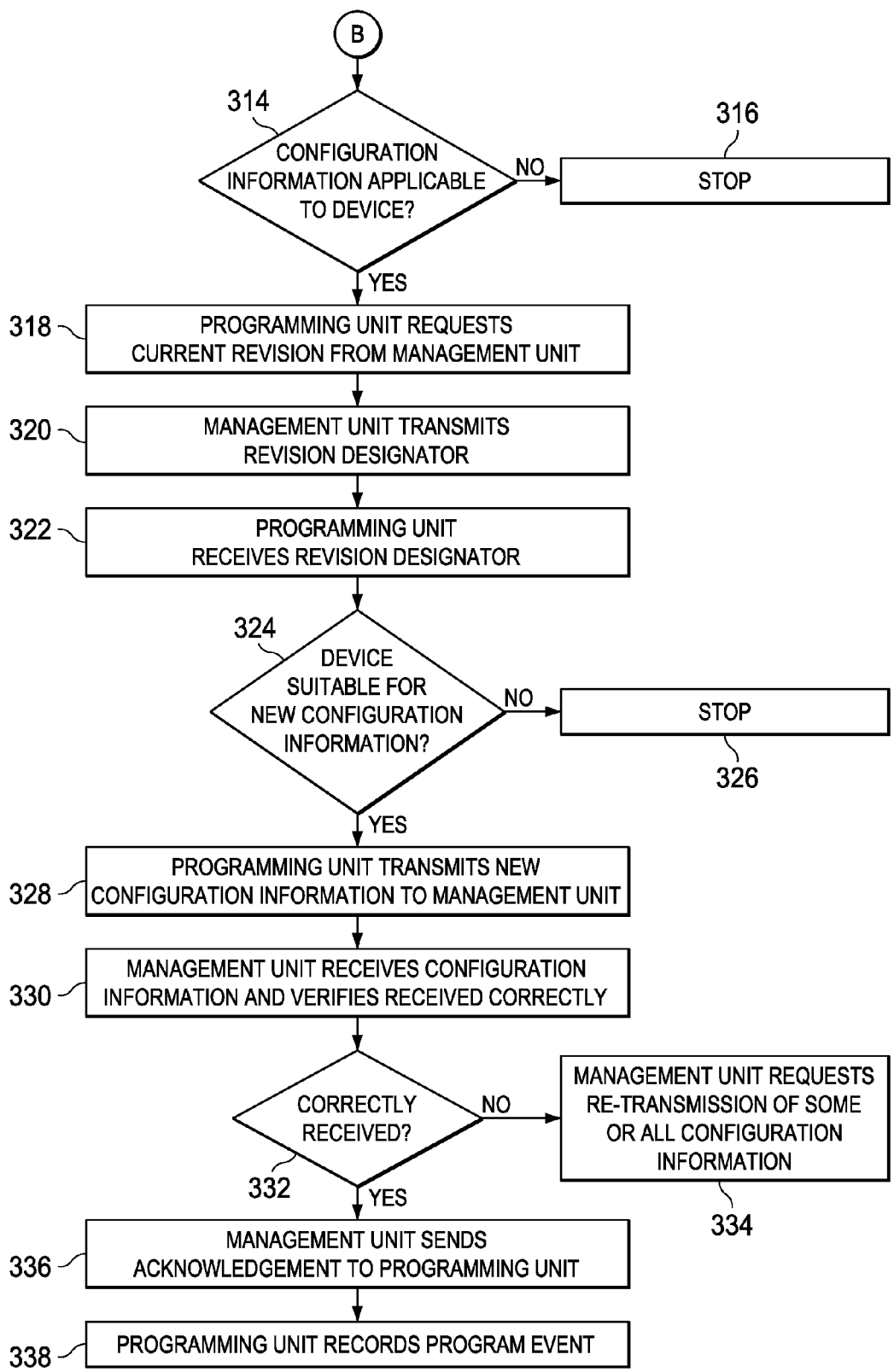

FIGS. 6A and 6B illustrate a method by which the programming unit 202 can reconfigure the configurable electronic device 230 via power and data cable 225 and while the configurable electronic device 230 is still in a shipping box. The various actions listed in FIGS. 6A and 6B can be performed in the order shown or in a different order. Some of the actions may be performed in parallel. Some of the actions are performed by the programming unit 202 and other actions are performed by the configurable electronic devices 230. The actions performed by the programming unit 202 may be performed by the programming unit's host processor 204 upon execution of software 214. The actions performed by the configurable electronic devices 230 may be performed by the controller 242 which may have its own embedded firmware.

At 302, a user opens the flap 252 on the shipping box 250 to thereby expose the connector 233 on the configurable electronic device 230. At 304, the user connects the cable 225 to the programming unit 202 and to the exposed connector 233 on the configurable electronic device 230 through flap 252. At 306, the power from the programming unit 202 is provided through the connector 233 to power up the components of the management unit 239, but not the host logic 234. At 308, the programming unit 202 requests the management unit 239 to provide the device unique ID and product designator of the configurable electronic device 230, which are transmitted by the management unit 239 to the programming unit 202 at 310. At 312, the programming unit 202 receives the device unique ID and product designator.

Turning to FIG. 6B, the programming unit 202 determines (314) whether the configurable electronic device 230 is possibly suitable to receive the configuration information 216. This determination can be accomplished by comparing the product designator received from the configurable electronic device 230 to a product designator associated with the configuration information 216. If the configurable electronic device 230 is determined to be a mismatch for the configuration information, then the reconfiguration process stops at 316. Even if the product designator is a match, the configurable electronic device 230 still may not be suitable to receive configuration information 216 due to the revision designator of the device's current configuration information. Accordingly, if the configurable electronic device 230 is determined to be a possible match for the configuration information (product designator is match but still unknown about the revision designator), then at 318, the programming unit requests the current revision designator from the management unit 239, which the management provides at 320 and which is received by the programming unit at 322.

At 324, the programming unit 202 examines the revision designator to determine whether the configuration information 216 is suitable to be provided to the configurable electronic device 230, as opposed to the configurable electronic device 230 already having the configuration information and thus not needing it. If the configurable electronic device 230 is not suitable for receiving the configuration information, the reconfiguration process stops at 326. However, if the configurable electronic device 230 is suitable to receive the configuration information, then at 328 the programming unit 202 transmits the configuration information across cable 325 to the management unit 239 (received at 330). The configuration information may be transmitted as one packet or as a series of packets as explained above. Each packet has a data payload, error bits, and packet sequence number. The management unit 239 verifies (332) whether the packets were received without error (e.g., using the error bits explained above). If a packet was received with an error, the management unit at 334 requests the programming unit 202 to retransmit just the packet(s) received with an error, or may request a retransmission of all of the packets. Otherwise, if no errors were detected, then at 336 the management unit 239 sends an acknowledgment packet to the programming unit 202 informing the programming unit that the configuration information was successfully and accurately received. At 338, the programming unit records that that particular configurable electronic device 230 (by way of, for example, its device unique ID) was reconfigured with the particular revision of the configuration information.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An apparatus, comprising:
a controller;
an antenna coupled to said controller, wherein said antenna is to receive a wireless signal from an external source to power the controller; and
a battery to selectively power said controller,
wherein upon being powered via the antenna, the controller is to monitor signals received by the antenna for a predetermined bit sequence indicating a start of a wireless reconfiguration process,
wherein upon detecting the predetermined bit sequence, the controller is to activate the battery to provide power to said controller instead of the antenna, and
wherein the controller is to monitor the signals received by the antenna for the predetermined bit sequence prior to receiving configuration information from an external programming unit.

2. The apparatus of claim 1, wherein, upon activating the battery, the controller is to receive packets of configuration data via said antenna from an external programmer.

3. The apparatus of claim 1 wherein, upon receiving a wireless request for a product designator and a device unique identifier, the controller is to wirelessly transmit a product designator and a device unique identifier of said apparatus.

4. The apparatus of claim 1 wherein said controller is to wirelessly receive a series of data packets, each packet containing a portion of configuration information for said apparatus.

5. The apparatus of claim 1 further comprising a shipping box in which said controller, antenna, and battery are contained while said controller activates the battery.

6. An apparatus, comprising:
a host processor;
storage coupled to said host processor and containing configuration information; and
a wireless transmitter coupled to said host processor,
wherein said wireless transmitter is to wirelessly and simultaneously transmit said configuration information to a plurality of configurable electronic devices contained in shipping boxes within wireless communication range of said wireless transmitter, and
wherein, prior to transmitting the configuration information, the wireless transmitter is to transmit a signal containing a predetermined bit sequence indicating a start of a reconfiguration process to the plurality of configurable electronic devices.

7. The apparatus of claim 6, wherein, prior to transmitting the configuration information, said wireless transmitter is to repeatedly transmit the signal containing the predetermined bit sequence indicating the start of the reconfiguration process.

8. The apparatus of claim 6, wherein said wireless transmitter is to transmit a request for any of a product designator or a device unique identifier from any of the plurality of configurable electronic devices within wireless communication range of said apparatus.

9. The apparatus of claim 8, wherein said wireless transmitter is to receive one or more response messages from any of the plurality of configurable electronic devices within wireless communication range, said response message containing any of the product designator or device unique identifier of such configurable electronic devices.

10. The apparatus of claim 9, further comprising an output device coupled to said host processor, wherein said output device identifies, based on said one or more response messages, which of the plurality of configurable electronic devices are within wireless communication range.

11. The apparatus of claim 9, wherein said host processor is to determine for which of the plurality of configurable electronic devices that are within wireless communication range the configuration information is applicable based on said one or more response messages.

12. The apparatus of claim 6, wherein said host processor is to record which of the plurality of configurable electronic devices were successfully provided with said configuration information.

13. A method comprising:
receiving, by an antenna of a device, a wireless signal from an external source to power a controller in the device;
monitoring, by the controller, signals received by the antenna for a predetermined bit sequence indicating a start of a wireless reconfiguration process;
in response to a determination that the signals comprise the predetermined bit sequence, activating a battery to provide power to the controller instead of the antenna; and
receiving, by the controller, packets of configuration data via the antenna from the external source through consumption of power from the battery.

* * * * *